United States Patent
Farrelly

(10) Patent No.: US 11,591,010 B2
(45) Date of Patent: *Feb. 28, 2023

(54) ELECTRICAL POWER STEERING SYSTEM

(71) Applicant: ZF Automotive UK Limited, Solihull (GB)

(72) Inventor: James Owen Patrick Farrelly, Kenilworth (GB)

(73) Assignee: ZF Automotive UK Limited, Solihull (GB)

( * ) Notice: Subject to any disclaimer, the term of this patent is extended or adjusted under 35 U.S.C. 154(b) by 409 days.

This patent is subject to a terminal disclaimer.

(21) Appl. No.: 16/843,786

(22) Filed: Apr. 8, 2020

(65) Prior Publication Data

US 2020/0339185 A1 Oct. 29, 2020

(30) Foreign Application Priority Data

Apr. 23, 2019 (GB) ...................................... 1905666

(51) Int. Cl.
  *B62D 5/04* (2006.01)
  *B62D 1/20* (2006.01)
  *B62D 15/02* (2006.01)
  *B62D 6/00* (2006.01)

(52) U.S. Cl.
  CPC ............ *B62D 5/0463* (2013.01); *B62D 1/20* (2013.01); *B62D 5/0481* (2013.01); *B62D 6/008* (2013.01); *B62D 15/0215* (2013.01)

(58) Field of Classification Search
  CPC .... B62D 5/0463; B62D 5/0481; B62D 6/008; B62D 15/0215
  See application file for complete search history.

(56) References Cited

U.S. PATENT DOCUMENTS

| 6,876,910 | B2 * | 4/2005 | Kifuku ................. | B62D 5/0466 |
| | | | | 180/443 |
| 9,731,757 | B2 * | 8/2017 | Bean ...................... | B62D 6/008 |
| 2011/0066330 | A1 | 3/2011 | Kim | |
| 2011/0190984 | A1 | 8/2011 | Reeve | |
| 2019/0031231 | A1 | 1/2019 | George | |
| 2020/0247461 | A1 * | 8/2020 | Farrelly ............... | B62D 5/0463 |

FOREIGN PATENT DOCUMENTS

| DE | 112014001750 T5 | 12/2015 | |
| EP | 2364896 A1 * | 9/2011 | ........... B62D 5/0463 |
| JP | 2002037109 A | 2/2002 | |
| JP | 2009292233 A | 12/2009 | |

\* cited by examiner

*Primary Examiner* — Jacob D Knutson
(74) *Attorney, Agent, or Firm* — Robert James Harwood

(57) ABSTRACT

An electric power steering apparatus includes a steering mechanism, an electric motor, a torque signal generator, a column angular position signal generator and a signal processing unit. The steering mechanism operatively connects a steering wheel to the road wheels of the vehicle. The electric motor may be operatively connected to the steering mechanism. The torque signal generator may produce a torque signal indicative of the torque carried by a portion of the steering mechanism. The column angular position signal generator may produce a column angle signal indicative of the angular position of the steering wheel or steering column. The signal processing unit may receive the column torque signal and the column angle signal and may produce therefrom a torque demand signal representative of a torque to be applied to the steering mechanism by the motor.

11 Claims, 11 Drawing Sheets

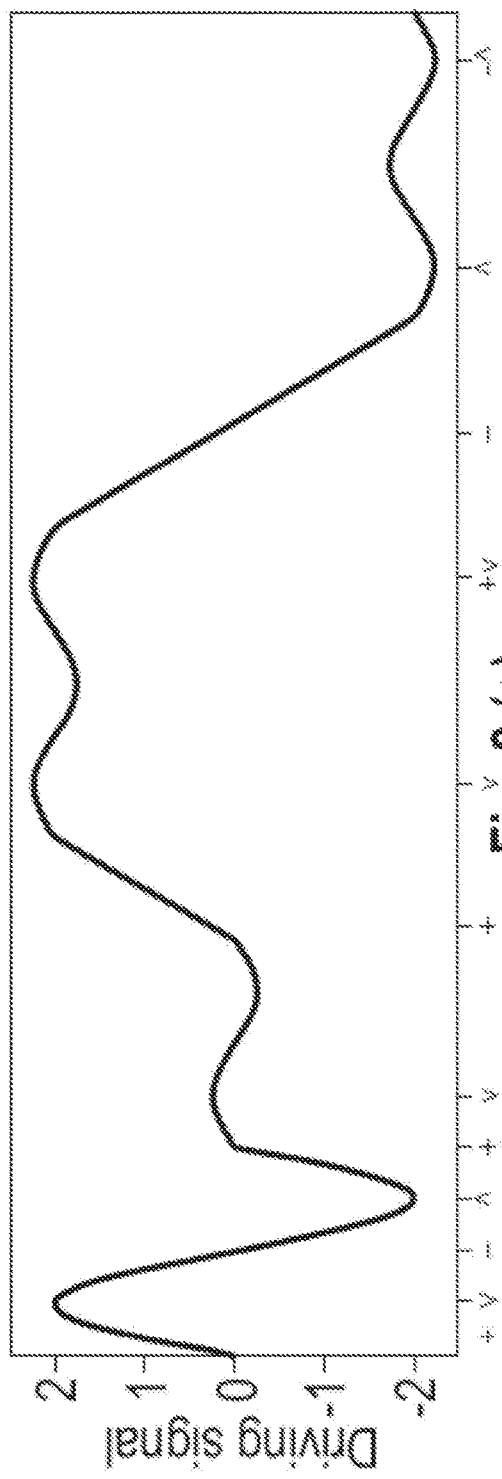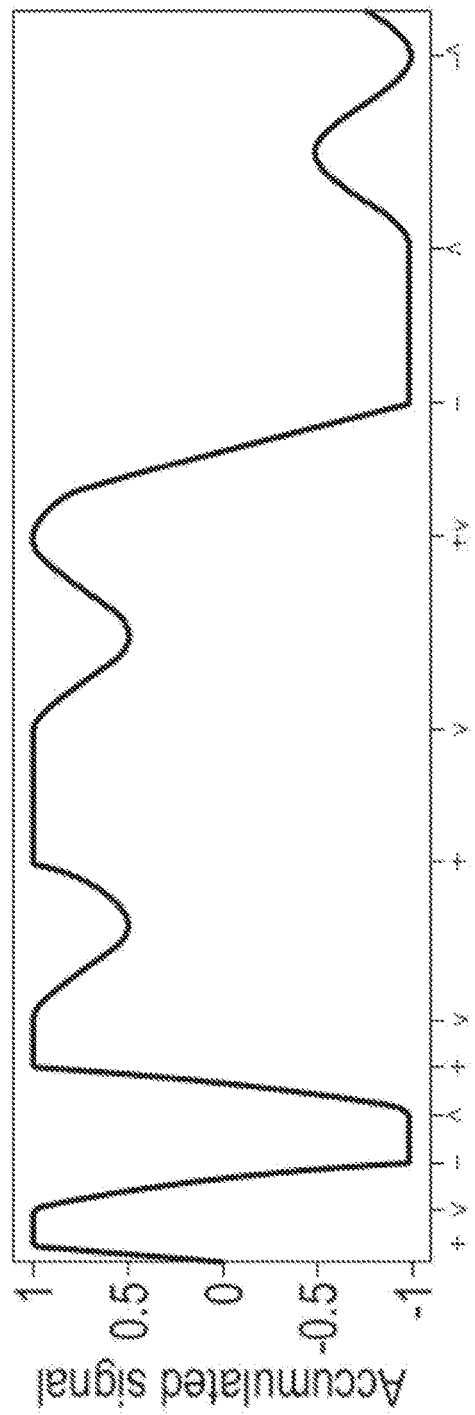
Fig. 8(a)
Fig. 8(b)

ELECTRICAL POWER STEERING SYSTEM

CROSS-REFERENCE TO RELATED APPLICATION

This application claims priority to UK Patent Application No. 1905666.2, filed Apr. 23, 2019, the disclosure of which is incorporated herein by reference in its entirety.

TECHNICAL FIELD

This disclosure relates to electrical power steering systems of the kind in which an electrical motor is adapted to apply an assistance torque to a steering component such as a steering column so as to reduce the driver effort required to control the vehicle.

BACKGROUND

In a typical electric power steering system, a torque sensor is provided which is arranged so that the level of torque in a steering column is measured. From this measurement a controller calculates the value of a torque demand signal that is indicative of the torque that is to be generated by an electric motor attached to the steering column. The motor applies a torque to the column of the same sense as that demanded by the driver and thus reduces the effort needed to turn the wheel.

The relationship between the steering column torque and the assistance torque may be set by a boost curve. This is a mapping between the column torque and the assistance torque where for a given input torque a multiplier value is defined that determines an amount by which the input signal is multiplied. To apply a boost, the value of the multiplier for a given input torque will be not unitary, 1.0. For example, if the multiplier is 2.0 then the output assistance torque will be twice the measured torque, if it is 0.5 it will be half the measured column torque. Instead of a multiplier it is also possible to define the relationship between input torque and assistance torque using a look up table, or in any other convenient manner. The boost curve will then be hard coded into the look up table.

Vehicle manufacturers require that steering systems have low levels of friction. The reason for this is that high levels of steering system friction have a negative impact on the driver's perception of the refinement of the steering system. Experienced drivers will report that a steering system with low friction provides sharp, precise feedback of the contact between the tyres and the road; whereas they will report that a steering system with high friction provides vague feedback of the contact between the tyres and the road. Vehicle manufacturers further require that friction levels are controlled: part to part, over the operating temperature & humidity range, and over the life of the vehicle.

Vehicle manufacturers also require that steering systems have good rattle performance, e.g. when excited by a rough road surface input. In an electric power steering system, rattle may be present within the gearbox that connects the motor to the steering column for example. The friction and rattle requirements result in a mechanical design trade-off: a low friction design will have some free play which results in rattle; a low rattle design will have no free play resulting in high friction. Typically, a design that attempts to meets both requirements will make use of: tight manufacturing tolerances, advanced material choices, and advanced lubricant (grease) choices.

There are several different forms of undesirable friction, one of which is stiction or static friction. This is a force between two or more parts of the steering system that is present when they are not moving relative to each other, and which must be overcome if the two or more parts are to be moved. In the case of the steering system, this becomes apparent to the driver when they try to start to turn the wheel from a static position, or on changing the direction in which the wheel is being turned.

It is known to provide an electric power assisted steering apparatus in which a friction compensating torque is applied to the steering to compensate for both static and kinetic friction. The apparatus generates the friction compensating torque based on assumptions of the level of static friction present in the steering mechanism made during the design or commission of the steering apparatus.

SUMMARY

An object of the present disclosure is to provide a method of operating a steering apparatus which provides an improved steering feel where the effects of static friction and kinetic friction are at least partially overcome, and to an improved steering apparatus.

According to a first aspect, the disclosure provides an electric power steering apparatus of the kind comprising: a steering mechanism which operatively connects a steering wheel to the road wheels of the vehicle; an electric motor operatively connected to the steering mechanism; a torque signal generator adapted to produce a torque signal indicative of the torque carried by a portion of the steering mechanism; a column angular position signal generator for producing a column angle signal indicative of the angular position of the steering wheel or steering column; and a signal processing unit adapted to receive the column torque signal and the column angle signal and to produce therefrom a torque demand signal representative of a torque to be applied to the steering mechanism by the motor.

The signal processing means includes: a first signal processing circuit which receives an input signal dependent on the column torque signal and outputs an assistance torque signal, the relationship between the input and the output of the first signal processing circuit being defined by a boost curve; a second signal processing circuit which generates a friction compensating torque signal, the value of the friction compensating torque signal being derived from observations of both the column torque signal and the column angle signal over time; and a torque demand signal generating circuit adapted to produce the torque demand signal as a function of both the friction compensating torque signal and the assistance torque signal; and in which the friction compensating torque signal at least partially assists the driver in overcoming the effects of static and/or kinetic friction in the steering mechanism.

The apparatus may further comprise: a friction estimator which generates an estimate of the static friction in the steering mechanism; and in which the friction compensating torque signal generated by the second signal processing circuit is adapted as a function of the estimate of friction.

By adapting the friction compensating torque signal as a function of the estimated friction, the apparatus can compensate dynamically for changes in that friction during use of the apparatus and over time.

The second signal processing circuit may generate the friction compensating torque signal by generating a dimensionless friction compensation factor and multiplying that factor by a friction compensation torque level that is adapted as a function of the estimated friction.

The second signal processing circuit may therefore apply and adapted gain level as the mechanism for adapting the friction compensating torque signal, increasing or decreasing the compensation torque as the gain increases or decreases respectively.

The friction compensation factor may have a value in the range +1 to −1 and may in one arrangement be determined using an equation of the form:

Friction compensation factor=$X$*Accumulated column angle+$Y$*Accumulated column torque where X and Y are themselves scaling factors.

The second signal processing circuit may generate a friction compensation factor that comprises a first component derived from observations of the column torque signal over time and a second component which is derived from observations of the column angle signal over time. The two components may be independent of each other such that the value of one is independent of the value of the other.

The second signal processing circuit may be adapted to generate the friction compensating torque signal as a function of the sum of the two independent components. This ensures that the static friction compensating torque signal may vary even when one of the component values remains zero. For example, if the torque is observed to increase prior to the steering moving, some compensation will be phased in. This, as will become apparent, is beneficial in mitigating the effects of static friction in the system by helping the driver overcome the torque that is otherwise needed to overcome that static friction.

Of course, it is within the scope of the disclosure for the second signal processing circuit to observe both the column torque signal and column angular signal together to generate the static friction compensation signal without generating two separate components. But conceptually it is simplest to consider the disclosure in terms of the signal being the result of two independent components.

The friction estimate may be formed by observing the change in torque in a portion of the steering column as a function of column angle.

The estimate of friction may only be updated when the underlying vehicle and steering system conditions are appropriate.

The friction estimator may be configured to generate an estimate of steering system friction every time the steering system changes direction.

The underlying vehicle and steering system conditions for friction estimation, and resulting steering data tests may meet one or more of the following criteria to ensure that estimates are only when conditions are appropriate:

| Vehicle/steering behavior to avoid | Conditions needed for estimate |
| --- | --- |
| Avoid tyre scrub condition at parking | Vehicle speed above a minimum value |
| Avoid significant vehicle aerodynamic effects on tyre loading | Vehicle speed below a maximum value |
| Avoid significant tyre loading effects due to lateral acceleration | Absolute lower column angle less than a maximum value |
| Avoid unacceptable estimation errors due to column damping effects | Absolute lower column velocity less than a maximum value. Reversal time above a minimum value. |
| Avoid unacceptable estimation errors due to column inertia effects | Absolute lower column velocity less than a maximum value. Reversal time above a minimum value |
| Avoid unacceptable estimation errors due to erratic driver or road inputs | Lower column angle and total lower column torque to change in a consistent fashion throughout the steering reversal. Reversal time below a maximum value |

The apparatus may include a memory which stores the estimated friction value.

The friction estimator may include a friction estimate manager which generates a confidence value indicative of the confidence in the estimated friction value.

The friction estimator may generate the friction compensation torque level by blending a fixed friction compensation torque level with an adaptive friction compensation torque level, where the fixed friction compensation torque level represents a fixed value and the adaptive friction compensation torque level is a function of the friction estimate.

The friction estimator may determine a ratio at which the two levels are blended which is a function of the confidence value of the friction estimate.

The friction estimator may blend the two levels so that the blend entirely or predominantly consists of the fixed friction compensation torque level when there is little or no confidence in the estimate.

When confidence of the estimate of friction exceeds a threshold level of confidence, for instance a confidence of 80 percent or higher, the blend may produce a friction compensation torque level that is primarily or solely as a function of the adaptive friction compensation torque level.

The friction estimate manager may generate two confidence values associated with the friction estimate, one being a long term confidence value indicative of a level of confidence in the friction estimate over a first period of time and the other a short term confidence value indicative of a level of confidence in the friction estimate over a second, shorter, period of time, the short term confidence value being generated from one or more recent estimates of friction and the long term confidence value being set dependent on the value of the short term confidence value where the weight is a tunable parameter.

The friction estimate manager may generate a long term confidence value that decays over time from a high confidence value to a low confidence value over a period of time whenever the short term confidence value has not been updated in that period of time.

The friction estimate manager may cause the long term confidence to decay towards 0% in the absence of any updated friction estimate and to cause the short term estimate to decay towards the long term estimate in the absence of an updated friction estimate. Alternatively, the friction estimate manager may cause the short term confidence value to decay towards a weighted version of the long term confidence where the weight is a tunable parameter. The short term confidence value may be used when setting the blend.

The friction estimate manager may update the confidence estimate or estimates using a first strategy when the steering apparatus is in use with the vehicle being driven, and a second strategy when the vehicle is parked and the steering apparatus is inactive. In use may be identified by the vehicle ignition being switched on, and parked may be identified by the vehicle ignition being switched off.

It may be beneficial to leave some friction in the system, and so to not fully compensate, in order to give a more natural steering feel. The second processing means may set the friction compensating torque signal generated by the second signal processing circuit as a function of both a target friction and the estimated friction.

It may adapt the friction compensating torque signal as a function of the difference between the target and the estimated friction. The apparatus may blend the friction compensating torque component with a fixed friction compensating torque component.

A key aspect of the disclosure is the use of actual friction estimates which give an insight into changes in friction in the system over time and the management of the confidence in those estimates.

The torque demand signal generating circuit may be arranged to produce the torque demand signal by summing the friction compensating torque signal with the assistance torque signal.

To ensure that the friction compensating torque signal reacts to all changes in steering direction, both whilst travelling straight and whilst in a curve, and to ensure that the reaction is proportionate to changes in column torque, the second signal processing circuit may be arranged to vary each of the first component and the second component in a fashion proportional to the changes in the driving signals. The first and second components may therefore vary in a manner which is not related to time, only to changes in the underlying drive signals. By drive signal we mean the column torque signal or the column angle signal. The first component may therefore be dependent on an accumulated column torque signal which has a value that is derived from historically observed values of the column torque signal. Similarly, the second component may be dependent on an accumulated column angle signal which has a value that is derived from historically observed values of the column angle signal.

An accumulated column torque signal may be generated by the second processing circuit with a value in a range $-N$ to $+N$, the value saturating at $+N$ for a sustained increase in the column torque signal, saturating at $-N$ for a sustained decrease in the column torque signal, and behaving in a proportional fashion over the range $-N$ to $+N$, tracking all changes in the column torque signal. The value of N may be any positive number, and is most conveniently set as $N=1$.

The first component may have a value that increases in proportion to an increasing column torque signal for as long as the column torque signal is increasing until the magnitude reaches the upper limit $+N$, and will then remain at that upper limit for so long as the column torque signal does not decrease, and which decreases in proportion to a decreasing column torque signal until the magnitude reaches the lower limit $-N$, and will then remain at that lower limit for so long as the column torque signal does not increase.

The first component has no rest value it will retain its last value for so long as the column torque signal value rests at any value for a period of time.

The second component may also vary in the same way, but as a function of the accumulated change in the column angular position signal rather than the column torque signal.

Thus, the second component may have a value in a range between a lower limit $-M$ and an upper limit $+M$, the value increasing in proportion to an increasing column position until the magnitude reaches the upper limit $+M$, and remaining at that upper limit for so long as the column position signal does not decrease, and which decreases in proportion to a decreasing column position until the magnitude reaches the lower limit, and will then remain at that lower limit for so long as the column position does not increase, the value of the second component having no rest value, and retaining the last value when the column stops rotating. The value of M may be any positive number, and is most conveniently set as $M=1$.

The applicant has appreciated that a proportional response is most preferred as it enables the static friction compensation value to be introduced in a manner that is least intrusive to the driver. The response of the friction compensation factor being in proportion to the change of the driving signals.

In one convenient arrangement, the second signal processing circuit may be arranged to produce each of the two components by generating a scaled difference followed by a limited integrator. The scaled difference may be formed by observing the difference between subsequent time samples of the driving signal (torque or column angle) and then scaling them by a factor 1/limit to form a signal 'scaled delta', i.e. differentiation of the input signal followed by scaling. The limited integrator may then cumulatively summate the signal 'scaled delta', limiting the summation to the range $-N$ to $+N$ or $-M$ to $+M$ to give the required saturation at the limits. The required component is the output from the limited integrator. The scaling may be chosen so that the resulting integration has range $+/-1$ but it is also possible to have no scaling and a resulting $+/-$limit range. Other variants are possible within the scope of the disclosure.

The upper limit and the lower limit of each of the two components, $+/-M$ an $+/-N$ may be set to be equal to $+1$ and $-1$ and the second signal processing circuit may be arranged to combine the two components with some additional scaling to give a friction compensation factor that is also in the range $+1$ to $-1$ which, as noted above, may in one arrangement be determined using an equation of the form:

a. Friction compensation factor $=X^*$Accumulated column angle$+Y^*$Accumulated column torque where X and Y are scaling factors.

Most conveniently these may both be set in the range 0.0 to 1.0 and such that $X+Y=1$, although giving them substantially equal weighting of 0.5 may be preferable, so that in the case where N and M are set to 1 and $X+Y=1$ the function will give a friction compensation factor in the range $+1$ to $-1$. The compensation factor is therefore the sum of the two independent components. The summation of these independent components results in a friction compensation factor (and hence torque) that pre-empts the execution of each and every steering manoeuvre (as the driver needs to apply torque to the steering wheel in order for the steering system to start rotating). To effectively compensate the negative effects of steering system friction it is important that the friction compensation torque is applied as the driver executes the manoeuvre. By contrast, a friction compensation torque based on column torque only would tend to be applied too early, whereas a friction compensation torque based on column angle would tend to be applied too late.

The first signal processing means may use a boost curve which comprises a mapping of desired assistance torque against input signal value, the gain increasing linearly, or non-linearly, with an increase in input signal value. The assistance torque produced by the apparatus will either be the value output from the boost curve, or that value plus any additional offset torque applied to the output of the boost curve. Of course, further processing of the signals may be provided to achieve the final assistance torque value.

The apparatus may include an area of electronic memory in which the function defining the scaling factors or boost curves, and/or any look-up tables are stored. The upper limit and lower limits, N and M, of each of the first and second components, and the friction compensation factor map (or related parameters X and Y) may be fixed, or may be varied over time. They may, for example, be varied as a function of vehicle speed, column position, or temperature, which may be the temperature of a part of the steering apparatus or the ambient temperature.

The torque signal generator may comprise a single torque sensor which is connected to the steering column or another mechanical component attached to it.

The signal processing unit may be implemented by a processor that executes program instructions stored in an area of memory. The instructions may cause the processor to perform a number of distinct steps or functions, which define the different sub-units of the signal processing unit. However, it may be possible to implement the signal processing unit using discrete electronic components such as digital logic gates, a group of logic gates forming each sub-unit.

The apparatus may include a motor drive circuit which receives the torque demand signal and applies appropriate signals to a motor drive stage to cause the motor to output the demanded torque. This drive stage will typically comprise a bridge circuit.

BRIEF DESCRIPTION OF THE DRAWINGS

There will now be described by way of example only one embodiment of the present disclosure with reference to and as illustrated in the accompanying drawings of which:

FIG. 8(a) shows an example, non-limiting driving signal according to the present disclosure;

FIG. 8(b) show an example, non-limiting resulting accumulated signal produced according to the present disclosure;

DETAILED DESCRIPTION

Figure 1:
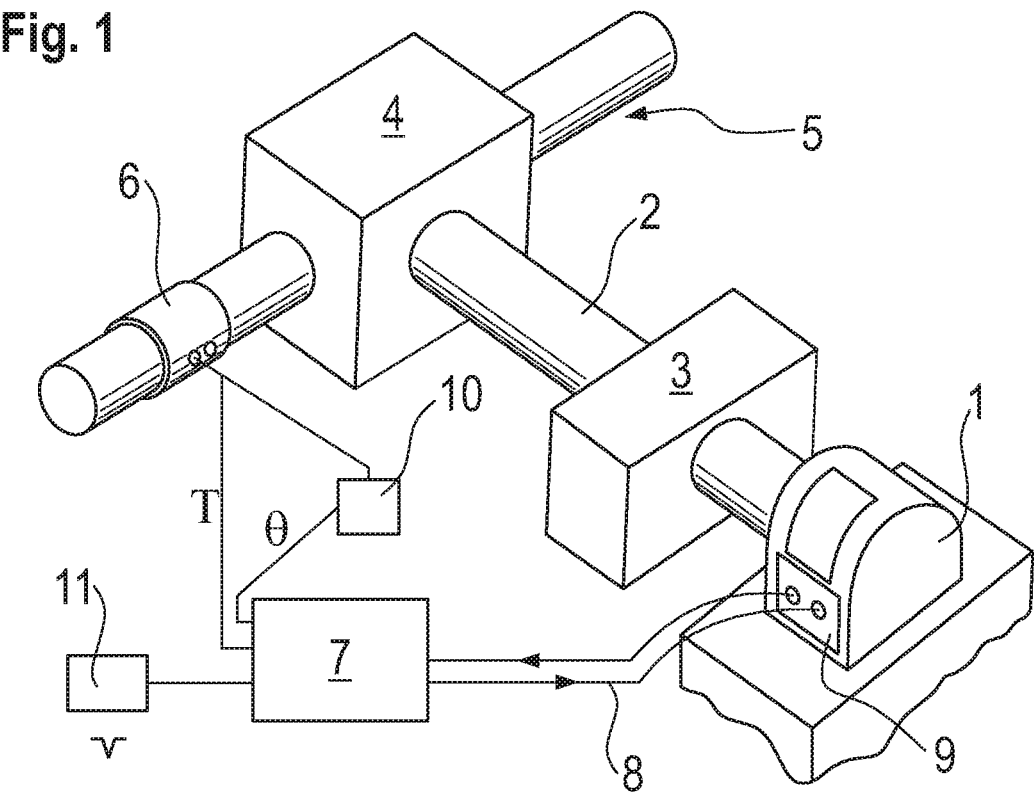
FIG. 1 is a schematic diagram of a prior art electric power assisted steering system.

A typical electric power assisted steering system is illustrated in FIG. 1 of the accompanying drawings. The system comprises an electric motor 1 which acts upon a drive shaft 2 through an (optional) gearbox 3. The drive shaft 2 terminates with a worm gear 4 that co-operates with a wheel provided on a portion of a steering column 5 or a shaft operatively connected to the steering column. For instance, the motor may act upon a steering rack of the steering system. Of course, this is not to be taken as limiting to the scope of protection we are seeking, and other power assisted steering systems are envisaged to which the disclosure has application. For example, instead of a column drive system as shown where the motor acts on the steering column the system may be of the so-called belt drive type in which the motor is connected directly to the steering rack.

The steering column 5 carries a torque sensor 6 that is adapted to measure the column torque Tcol carried by the steering column that is produced by the driver of the vehicle as the steering wheel (not shown) and hence steering column is turned against the resisting force provided by the vehicles road wheels (also not shown). The output signal, referred to herein as the torque signal Tcol from the torque sensor 6 is fed to a first input of a signal processing unit 7.

An angular position sensor 10 is also provided on the steering column shaft. As shown in FIG. 1, this is coupled to the torque sensor 6 because it measures the position by monitoring the signal output from the torque sensor. This produces an output signal indicative of the angular position Qcol of the steering column, referred to herein as the column position signal. The output from the position sensor, Qcol is fed to a second input of the signal processing unit 7. This may comprise an electronic processor unit or other electronic circuitry.

The signal processing unit 7 acts upon the two input signals to produce, as its output, a torque demand signal 8 that is passed to a motor controller 9. The motor controller 9 converts the torque demand signal 8 into drive currents for the electric motor 1. To produce this demand signal the processing unit includes a number of sub-circuits, each of which performs a single processing step or a specific set of steps.

The value of the torque demand signal 8 corresponds to the amount of assistance torque to be applied to the steering column by the electric motor 1. The value will vary from a minimum value corresponding to maximum output torque for the motor in one sense, through zero torque when the demand signal is zero, to a maximum motor torque of the opposite sense.

Figure 2:
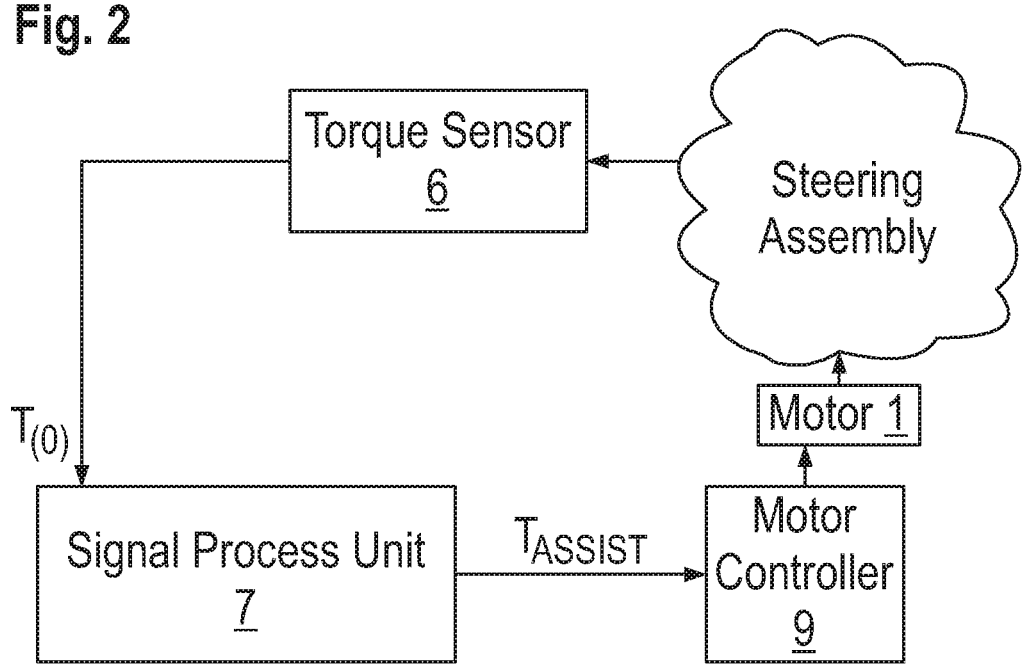
FIG. 2 is a block diagram representing the closed loop control of the motor in the system of FIG. 1.

The motor controller 9 receives as its input the torque demand signal and produces currents that are fed to the motor to reproduce the desired torque at the motor drive shaft 2. It is this assistance torque applied to the steering column shaft 5 that reduces the effort needed by the driver to turn the wheel. This forms a closed control loop as shown in FIG. 2.

The torque demand signal 8 is made up of at least two parts. The first part is an assistance torque Tassist which depends on the amount of torque a driver is applying to the steering column through the wheel, as determined from the value on the torque signal Tcol. The second part is an (optional) damping torque demand which is provided in order to improve the steering feel and/or enhance the safety of the system. Other torque demand signals can be used in addition, for example to help to counter the effects of cross winds on the vehicle which can cause it to stray from an intended path.

As noted above, the assistance torque signal is derived as a function of the torque in the steering column as measured by the torque sensor 6. The relationship between the measured torque and the assistance signal is essentially linear. However, other possible relationships may be used to map the torque to the assistance signal. As is widely known in the art, the relationship between the input and output defines a boost curve. As the measured torque increases the magnitude of the assistance signal generally increases. It will also be understood that the assistance torque signal may be dependent upon other parameters such as vehicle speed if required and the steering column position. In that case it is typical to reduce the value of the assistance torque signal at high speeds to enhance stability and increase it at very low speeds to ease parking manoeuvres.

Figure 3:
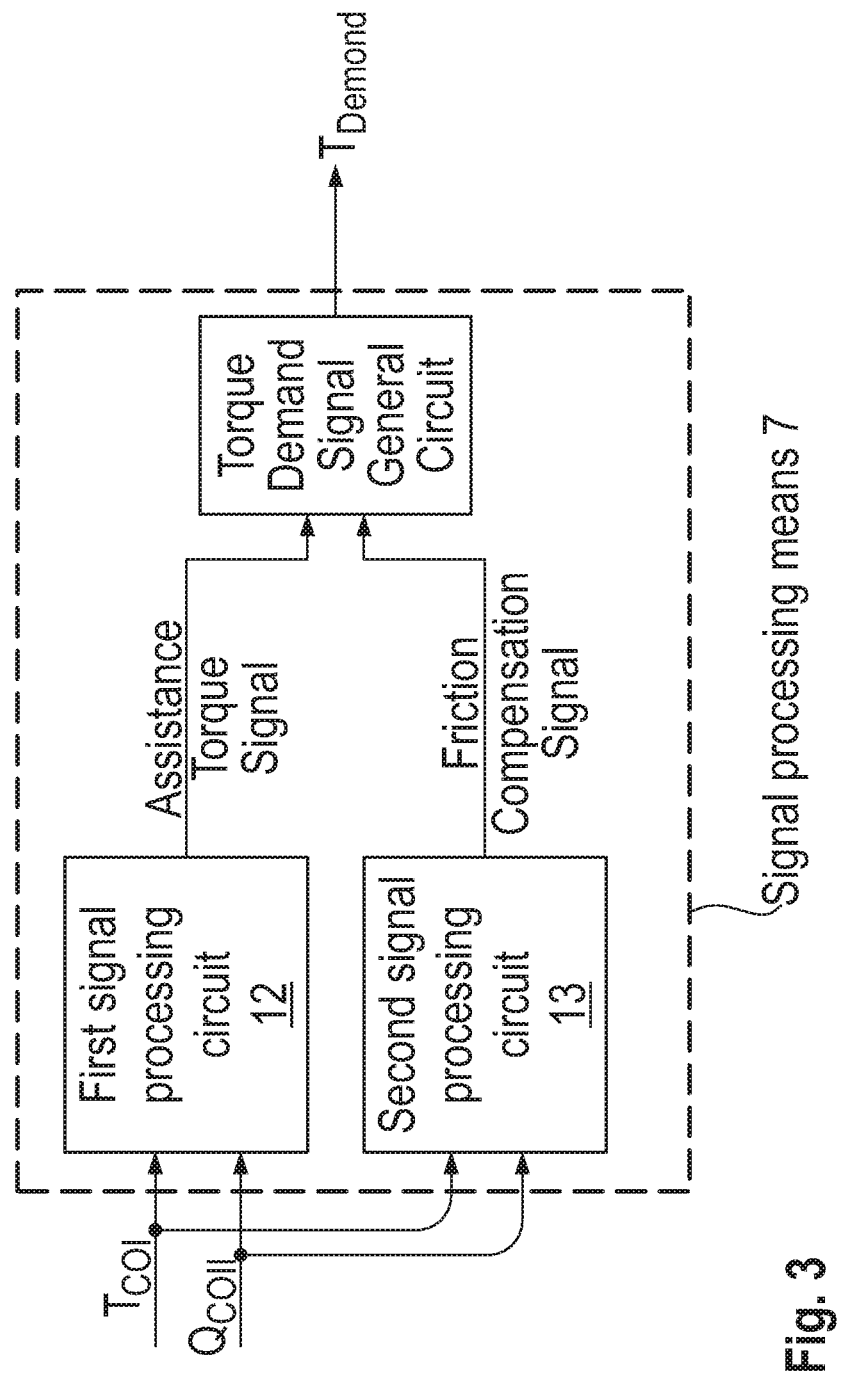
FIG. 3 is a block diagram illustrating the functional steps undertaken by the signal processing means in an embodiment of a steering assembly in accordance with the disclosure to produce the torque demand signal.

FIG. 3 shows schematically more detail of the signal processing means of the apparatus according to an embodiment of the present disclosure. As can be seen the signal processing means 7 comprises a first signal processing circuit 12 which applies the boost curve to an input signal that is a function of the column torque. The output of this boost curve defines the assistance torque. In addition, it also includes a second processing circuit 13 that in this example is in parallel to the first circuit 12. The second circuit receives as an input the column torque signal Tcol and generates an additional signal that modifies the torque demand signal under certain vehicle operating conditions. The purpose of the modification, as will be explained below, is to introduce an additional torque component that cancels out, at least partially, any effect of friction in the system. Significantly, the proposal of the present disclosure is able to reduce the negative feeling due to static friction in the system.

The second processing circuit 13 acts to apply a torque demand signal under defined circumstances. These circumstances are that the driver applied torque is increasing or decreasing, and as an independent factor that the steering column is moving in one direction or the other rather than being stationary. In particular, the additional amount of torque is increased or phased in gradually in a proportional manner until a limit value is reached, and similarly is phased out when the driver applies a torque in the opposite direction or reverses the rotation. Importantly, the additional torque will be phased in when only one of the two conditions is met, so that it will start to be phased in when a driver applied torque is introduced even prior to the column starting to move. In that respect the torque and column angle may be considered to have an independent effect on the value of the compensation signal.

The applicant has appreciated that it is possible to "predict" that the steering is going to move from being static to rotating by observing the driver applied torque and from this start to introduce a component to the torque demand signal that cancels out any resisting torque that the driver would otherwise have to overcome that is due to static friction in the system. By further combining this with an additional amount when the steering does start to move, a very good steering feel can be achieved, with the driver having little sense of any static friction in the steering system.

The driver's negative perception of steering system friction arises both when the driver attempts to start steering from a non-rotating steering condition, and when the driver attempts to change the direction of rotation of the steering system.

To phase in this additional component, the second signal processing circuit observes, or monitors, independently both the torque signal Tcol and the position signal Qcol. When it observes that either one is increasing or decreasing the additional component will be phased in, until it reaches a limit value if the condition continues to be met or until it is to be phased out again.

Figure 4:
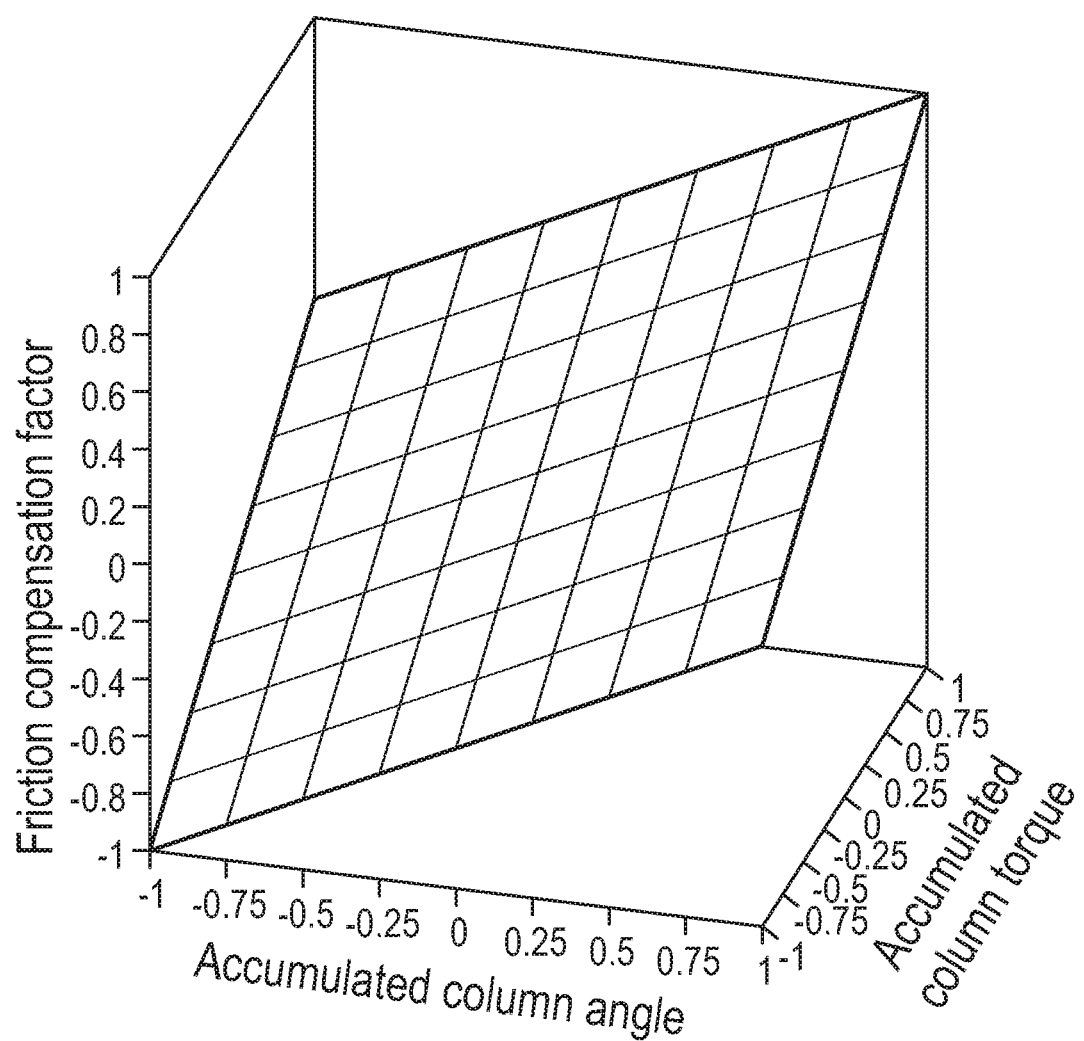
FIG. 4 is a mapping for two components that is used during the generation of a friction compensation signal.
Figure 7:
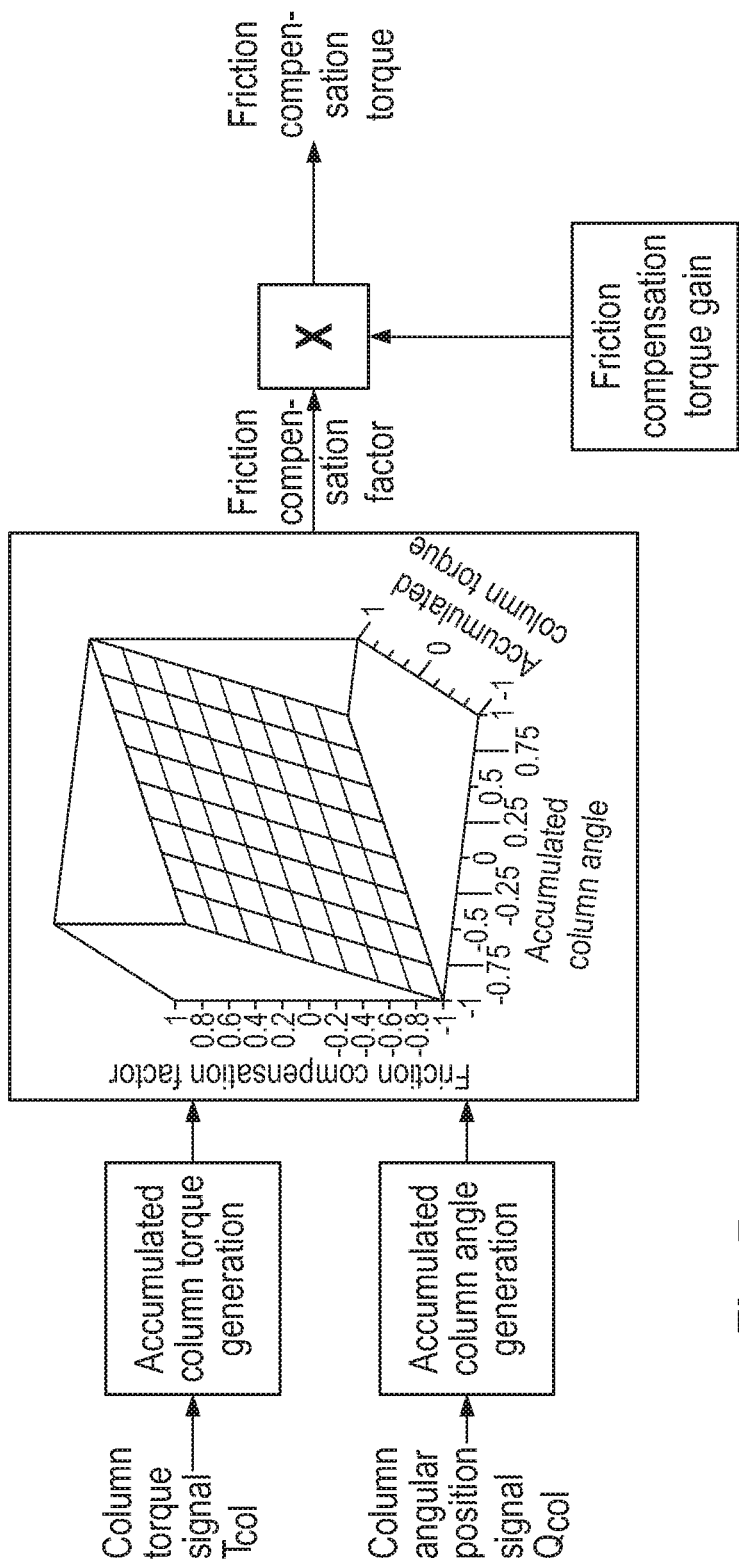
FIG. 7 is a block diagram illustrating how the friction compensation factor is used to generate the friction compensation signal.

The value of the additional friction compensating torque signal that is to be added is defined by a mapping between a signal referred to the accumulated column torque that is derived from the column torque and a signal referred to as the accumulated column angle derived from the column angle signal which provides a friction compensation factor, that is in turn multiplied by a friction compensation torque level. An exemplary mapping is shown in FIG. 4. Of course, other mappings are possible within the scope of this disclosure. FIG. 7 shows how the friction compensation torque level is applied to the map to produce the final friction compensating torque value. Note that the functionality of FIG. 7 is all implemented by the second signal processing circuit 12 in this embodiment.

It can be seen that the mapping is based on two component parts, each independent in value, with a first one dependent on observations of the column torque signal and the second based on observations of the column position signal.

Typically the range for the column angle component will be chosen so that the complete transition from zero to either the upper limit or lower limit occurs over 0.1 to 1.0 degrees of column movement. Similarly, the range for the column torque signal component will be chosen so that the complete transition occurs from zero to either the upper or lower limit when the torque signal changes by 0.1 to 1.0 Nm.

Figure 5:
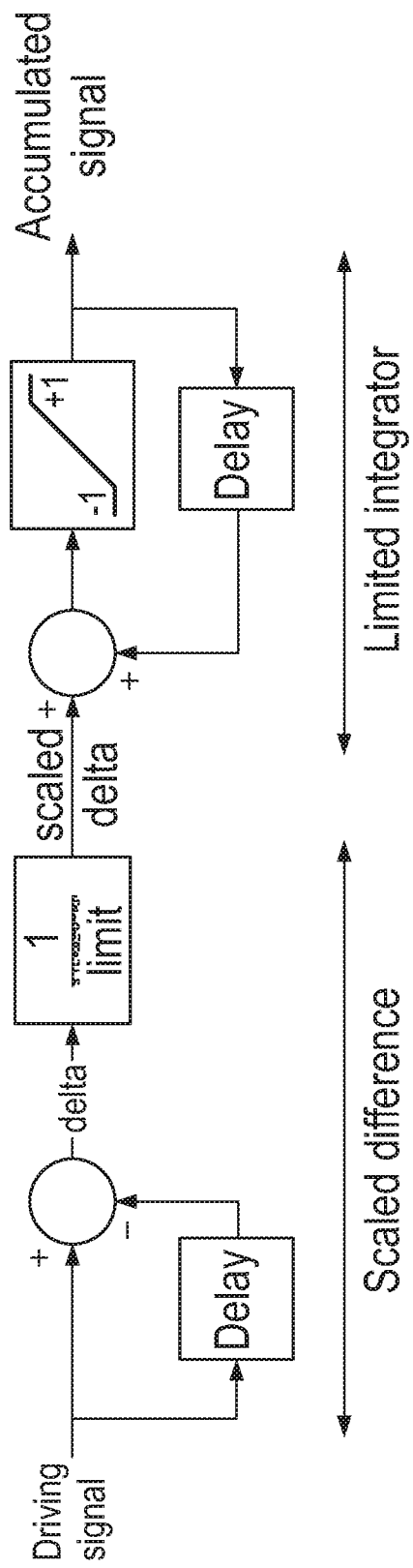
FIG. 5 is a block diagram that shows how a driving signal, which may be a torque signal or a column angle signal, is used to generate an accumulated signal for input to the map of FIG. 4.

FIG. 5 shows one specific implementation method for producing the two components that make up the friction compensating torque signal. For the column torque component, the implementation in this embodiment consists of a scaled difference followed by a limited integrator. The scaled difference forms the difference between subsequent time samples of the driving signal and scales them by a factor 1/limit to form signal 'scaled delta'. 'limit' is the magnitude value of the upper/lower torque. The limited integrator cumulatively summates the signal 'scaled delta', limiting the summation to the range −1 to +1. The first component will therefore take a value in the range −1 to +1, saturating at the upper or lower limits with a sustained increase or decrease in driver applied torque. The second component is produced in exactly the same way, but based on the column position.

FIGS. 8(a) and (b) show an exemplary drive signal, which may be the column torque signal or the column angle signal, and the corresponding accumulated signal that will be generated. The saturation at the limits can be clearly seen, as well as the tracking of small variations in the drive signal. The two components are then summed together, most conveniently with some additional scaling to give a friction compensation factor that is also in the range +1 to −1 as follows: Friction compensation factor=0.5*Accumulated column angle+0.5*Accumulated column torque The 0.5 terms ensure that the required output range of +1 to −1 is achieved. Of course, other terms could be used, and the two components could be given unequal weightings if desired. Note that this is the mathematical expression of the map (inclined plane) shown in FIG. 4. Changing the weightings changes the slope of the inclined plane. More complex shapes are possible, but that requires a look up table or a more complex equation.

This friction compensation factor may then be multiplied by the friction compensation torque level, which typically corresponds to a predefined friction value that may be stored in a memory of the apparatus, to give a torque value. For instance, a friction value of 2 Nm to 3 Nm is typical, representing the torque a driver must apply simply to overcome the friction inherent in the system to turn the steering wheel, so a gain factor of 2 Nm to 3 Nm may be applied to cancel this out.

Figure 6:
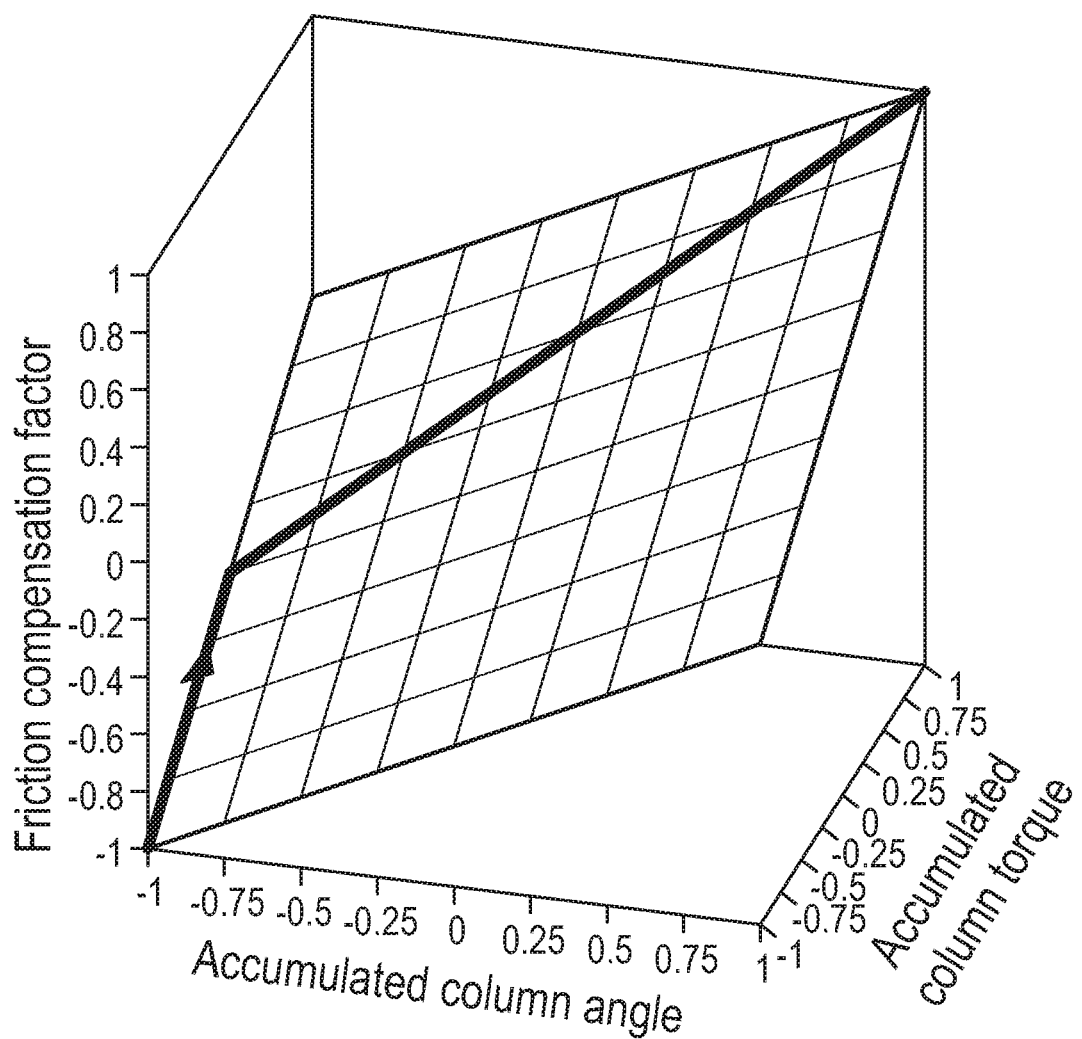
FIG. 6 shows how the friction compensation factor moves across the map as the driver applies a torque and subsequently turns the steering wheel during an exemplary manoeuvre.

FIG. 6 shows a typical trajectory of 'accumulated column torque' and 'accumulated column angle' across the map for a change in steering rotation from counter-clockwise direction to clockwise direction. The driver initiates the change of direction by increasing the column torque (first arrow), the accumulated column torque signal increases from −1 towards 0, the friction compensation torque factor increases from −1 to −0.5 to support the anticipated change in rotation direction. The steering system rotation direction starts to change (2nd arrow), the column angle starts to increase, the accumulated column angle starts to increase from −1 towards +1 whilst accumulated column torque further increase from 0 to 1, the friction compensation torque increases from −0.5 to +1 reflecting the confirmation of change of steering direction.

For a steering system design where the steering friction level is fixed, and does not change: part to part, and with temperature, humidity, and age; the above fixed friction compensation is sufficient. For steering system designs where these variations do occur, some variation in the amount of friction compensation may be beneficial.

The applicant has appreciated that the compensation can be easily adapted by changing the value of the friction compensation torque gain as a function of the actual friction in the steering mechanism. This introduces a novel means of adapting the above friction compensation torque value to changes in the friction in the steering system arising due to variations such as: part to part, temperature, humidity, and age. The result is the driver's perception of the steering system is that of a consistently low friction steering system irrespective of the condition of the underlying mechanical steering system.

In an embodiment within the scope of the disclosure that will be described hereinafter, the adaptation is achieved by dynamically changing the 'Friction compensation torque gain' in FIG. 7 though the addition of further features to the steering apparatus. In the described example the system generates two different 'column torque' signals. 'Upper column torque' is the torque measured by a torque sensor sensitive to the torque applied by the driver to the steering wheel. 'Total lower column torque' is the total torque applied by both the driver and an electric power steering motor and is a measure of the total load experienced by the steering system (including friction). Compensation uses 'Upper column torque' as it is most suitable for providing advance information of the driver change of steering position. Estimation uses 'Total lower column torque' as it is most suitable for measuring steering system friction.

Figure 9:
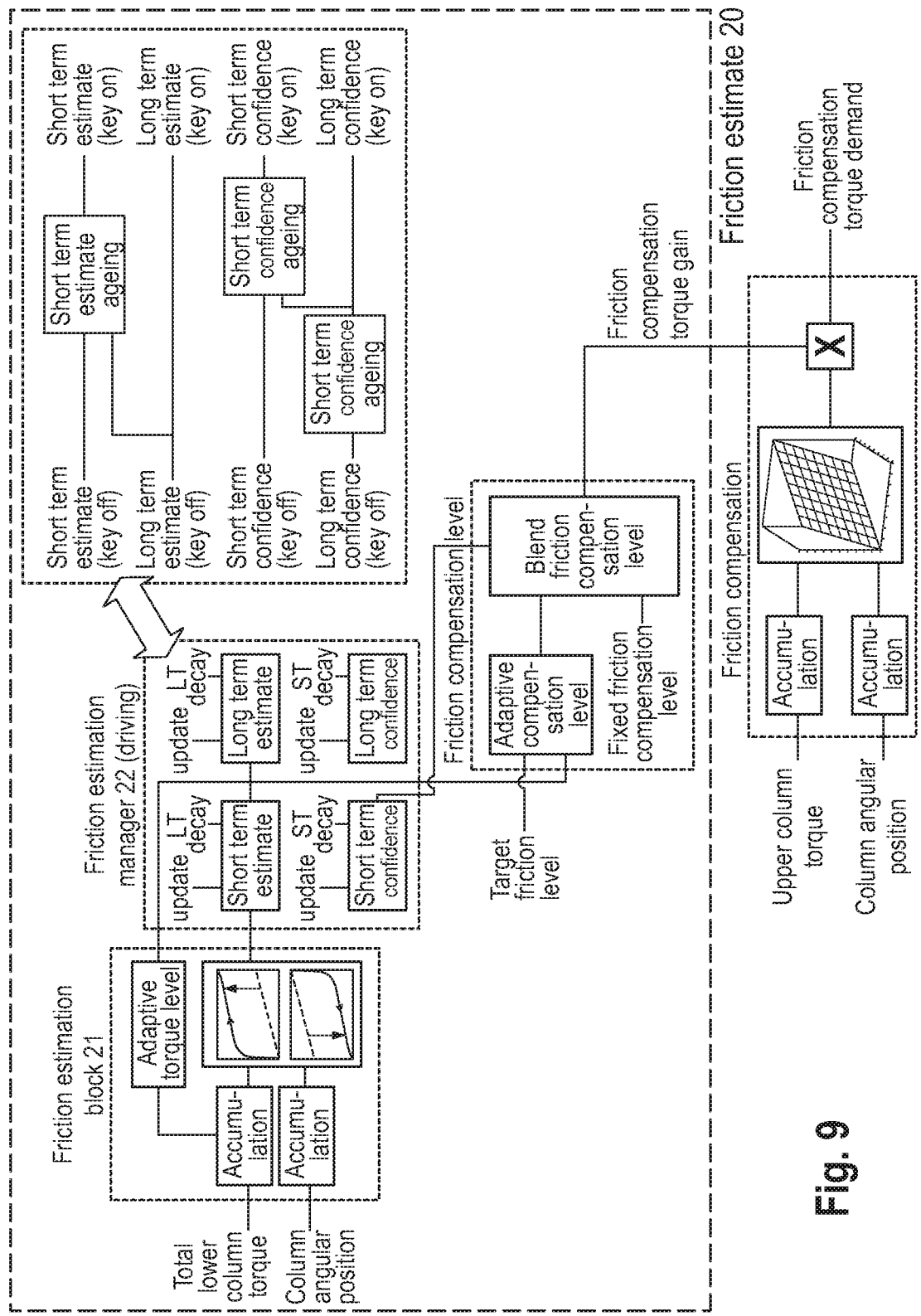
FIG. 9 shows an embodiment of an electric power assisted steering system in accordance with the present disclosure that employs an enhanced friction adaptation and compensation scheme.

As shown in FIG. 9, in addition to all of the functionality of the embodiment of FIG. 3, the apparatus includes a friction estimator 20 which takes as an input the total lower column torque and angle of the column 2, generates from this estimate of the steering system friction, and outputs an adapted friction compensation torque level. By adapted we mean that the value changes in use of the system over time to reflect changes in the friction in the system. As drivers only notice steering system friction for a small class of steering manoeuvres, primarily small slow steering inputs about centre whilst the vehicle is moving at reasonable speed, the friction estimator of FIG. 9 may focus on only estimating the actual steering system friction for the same class of steering manoeuvres. This means that any attempt by the driver (either intentional or accidental) to 'experience' the level of steering system friction, results in new steering system friction information becoming available to the adaptation mechanism, resulting in an appropriate level of friction compensation being applied so that the drivers 'experience' of steering system friction being regulated to a target level.

Whilst the apparatus does ensure that any attempt to experience steering system friction does result in a tendency to regulate steering system friction, there is a risk that the accumulated knowledge of steering system friction can become out of date in the case where the vehicle has either been parked for an extensive period, or operated in a manner that does not permit adaptation to take place (e.g. driven at low speed, or driven predominantly off centre). This would mean that if the vehicle is subsequently driven in a manner where friction is experienced there will be a transient behaviour whereby an inappropriate level of friction compensation (too much or too little) is applied until the adaptation responds to the new friction condition.

The friction estimator 20 comprises an estimation block 21 that generates friction estimates, and a friction estimate manager 22 that applies a confidence value to the estimate of friction. The confidence value and the estimate are processed together with a fixed friction compensation level to generate the friction compensation torque gain.

The estimate manager 22 attaches a confidence value (for example 0% to 100%) to the steering system friction estimate. Where a vehicle has been driven for a period in a manner that generates new steering system friction information, from recent estimates of friction, we can reasonably expect that the steering system friction estimate will be accurate, and the confidence high. Where a vehicle has been driven for a period in a manner that does not generate new steering system friction information, we can no longer expect that the steering system friction estimate will be accurate, and the confidence will be low.

When a vehicle is parked for a period, and no estimates of friction are being obtained because the vehicle steering apparatus is inactive (key off), the confidence in the steering system friction estimate is dependent on the length of time the vehicle is parked. If the parked time is short (minutes), we can reasonably expect that the steering system friction at the end of the parked period is comparable to that at the start of the parked period. If the parked time is long (hours), we can no longer expect that the steering system friction at the end of the parked period is comparable to that at the start of the parked period.

In the absence of new steering system friction estimates, historical data (from the same steering system), can provide an expectation as to the friction level on a particular steering system. The disclosure maintains short term and long term friction estimates of the steering system for this purpose.

The calculated friction compensation torque gain is modulated as a function of the confidence so that high confidence estimates are applied with full torque authority, whereas low confidence estimates are applied with low torque authority. This approach prevents the application of inappropriate friction compensation levels by ensuring that only high confidence estimates are acted upon with full authority. In the absence of any friction information on a particular steering system, we may still want to apply a level of friction compensation to correct for a known tendency for a complete family of parts o have excessive friction.

The apparatus of FIG. 9 includes a friction estimation block 21. The friction estimation block 21 generates an estimate of steering system friction, in this example every time the steering system changes direction. The friction estimate may be formed by observing the change in total torque carried by the steering shaft of the steering mechanism as a function of column angle. The estimator may only update when the underlying vehicle and steering system conditions are appropriate. It is a feature of the described embodiment of FIG. 9 that the conditions which are appropriate for steering system friction estimation are also appropriate for steering system friction assessment.

The underlying vehicle and steering system conditions for friction estimation, and resulting steering data tests may be those set out in Table 1 above.

Note that as the angular travel of the steering shaft for a reversal is fixed; and there is a requirement that lower column angle change in a consistent fashion throughout the steering reversal; the reversal time limit and lower column velocity limit result in an effective limitation on both column velocity and column acceleration.

Figure 10:
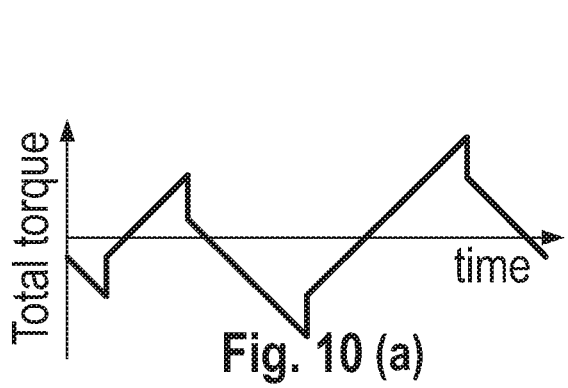
FIG. 10(a) illustrates an example, non-limiting change in torque over time.
FIG. 10(b) illustrates an example, non-limiting change in column angle over time.
FIG. 10(c) illustrates the Hysteresis characteristic arising from column torque vs. accumulated column angle during reversals.
Figure 10:
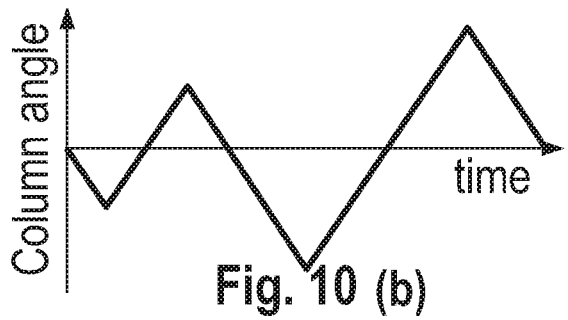
Figure 10:
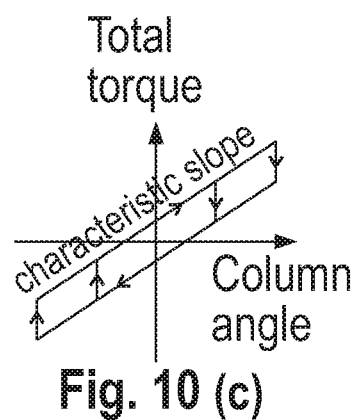

The objective of the friction estimator is to estimate the hysteresis of the total torque against the steering shaft angle. FIG. 10 shows the typical behaviour of shaft angle vs. shaft torque during a steering reversal of direction. A CW-CCW steering reversal is characterized by an increasing angle changing to a decreasing angle; and an increasing total torque changing to a decreasing torque. Typically, the change in torque leads the change in angle (due to inertia of the steering mechanism). A plot of torque vs. angle reveals a hysteresis characteristic with a characteristic slope. Typically, the slope increases with speed; and is due to the steering torque required to oppose that component of tyre lateral forces which are transmitted through the steering tie rods and steering gear to the steering column shaft.

Figure 11:
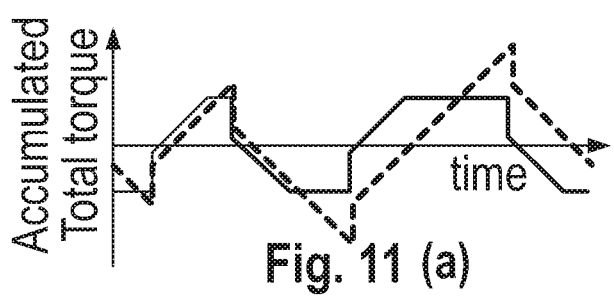
FIG. 11(a) illustrates an example, non-limiting change in accumulated total torque over time.
FIG. 11(b) illustrates an example, non-limiting change in accumulated column angle over time.
FIG. 11(c) illustrates the Hysteresis characteristic arising from accumulated total torque vs. accumulated column angle during reversals.
Figure 11:
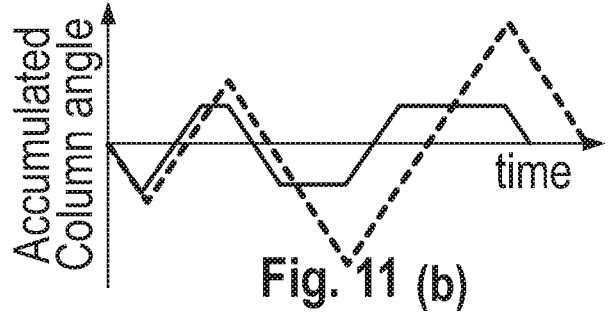
Figure 11:
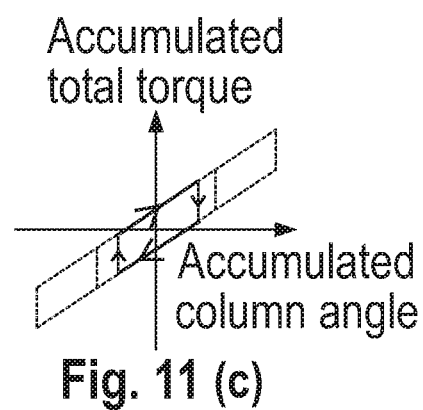

A simple and robust method to estimate the hysteresis of the above figure is to consider the behaviour of the accumulated shaft angle and accumulated shaft torque signals during a steering reversal of direction. The formation of accumulated signals is described in the previous disclosure. FIG. 11 shows this behaviour. The various hysteresis characteristics collapse to a single hysteresis characteristic.

Figure 12:
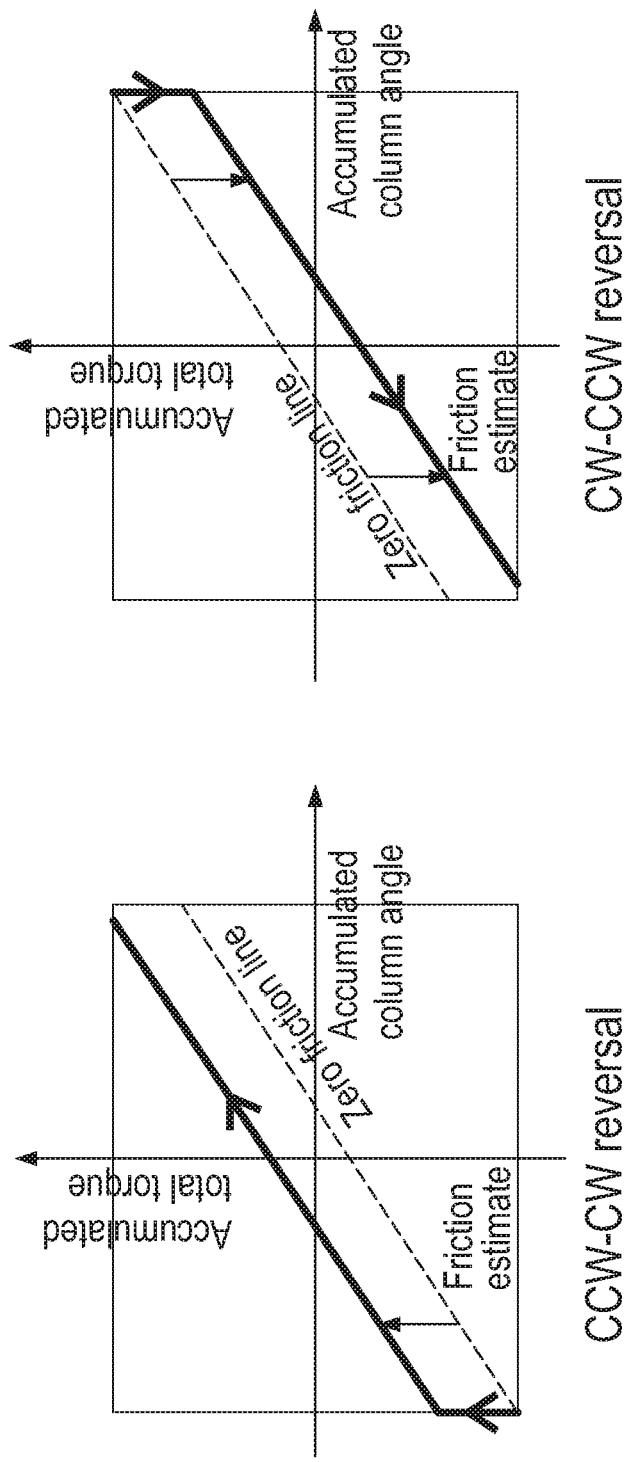
FIG. 12 illustrates the partial hysteresis curves for a counter-clockwise to clockwise (CCW-CW) reversal and for a clockwise to counter-clockwise (CW-CCW) reversal.

FIG. 11 shows the Hysteresis characteristic arising from accumulated total torque vs. accumulated column angle and FIG. 12 shows the partial hysteresis curves for a clockwise to counter-clockwise (CW-CCW) reversal and for a counter-clockwise to clockwise (CCW-CW) reversal. The CW-CCW steering reversal starts at the point where the accumulated lower column angle leaves its upper limit and ends at the point when the accumulated lower column angle reaches its lower limit. Likewise, the CCW-CW steering reversal starts at the point where the accumulated angle leaves its lower limit and ends at the point when the accumulated angle reaches its upper limit. In both cases the friction estimate is the average distance of the accumulated total torque from the 'zero friction' line (of characteristic slope) indicated.

In general, the range of the accumulated angle signal is determined by the angular range over which it is desired to perform friction estimation. A small range means that more steering reversals are considered, but only a small number of data points are considered for each reversal; a large range means that less steering reversals are considered, but a larger number of data points are considered for each reversal. Typically a compromise is found. The optimum range of the accumulated total torque signal is that range which ensures that the accumulated total torque signal reaches its limit value at the point where the accumulated angle also reaches its limit value.

The optimum range can be shown to be a function of: friction, angle range, slope, and headroom (to account for noise). As the optimum range is dependent on the value that the apparatus seeks to estimate, it is necessary that the estimated value (from earlier manoeuvres) is fed back to determine the appropriate range for later manoeuvres. It can be shown that this process is convergent: if the initial estimate is too high, subsequent estimates will be lower and drive the overall estimator, including feedback, to the correct value; likewise, if the initial estimate is too low, subsequent estimates will be higher and again will drive the overall estimator, including feedback, to the correct value.

An optional speed correction may be applied to the friction estimate to account for changes in friction measurement at different vehicle speeds due to aerodynamic loading and other factors (not shown in FIG. 9).

The short and long term estimates and confidences are updated by the friction estimate generator according to the following table 2:

TABLE 2

Update of short and long term estimates & confidences during driving

| Event | Short term estimate | Short term confidence | Long term estimate | Long term confidence |
| --- | --- | --- | --- | --- |
| Friction estimate update | Fast update towards friction estimate | Fast increment towards 100% | Slow update towards short term estimate | Slow increment towards 100% |
| Time effect | Fast update towards long term estimate | Fast decrement towards weighted long term confidence | No update | Slow decrement towards 0% |

Each friction estimate update represents new friction information entering the friction estimator. The new friction information affects first the short term estimate and confidence, and is then propagated to the long term estimate and confidence: the short term estimate is updated based on the new friction information, the long term estimate is updated based on the new short term estimate, the short and long term confidences are incremented towards 100% (the short term incremented by more than the long term).

The passage of time represents a loss of friction information, as the friction information that was attained has aged. The aging process affects first the long term estimate and confidence, and is then propagated to the short term estimate and confidence. The long term confidence decays towards 0%. The short term estimate decays towards the long term estimate, the short term confidence decays towards a weighted version of the long term confidence. This decaying process recognizes the fact that the long term estimate and confidence represent a floor, which in the absence of new updates the short term estimate and confidence decay towards.

To achieve good on centre feel, it is desirable both that the short term friction estimate reacts to genuine changes in steering system, but also that the short term friction estimate does not react to estimation errors. For this reason it is desirable that the short term friction estimate in general responds in a slow manner to changes in steering system friction; but reacts in a faster manner to systematic friction changes: following a key cycle where the steering apparatus is enabled; and/or following a change in tyre-road friction.

The proposed design contains two elements to ensure this desired response (not shown in FIG. 9): key on boost: provides a faster short term learning update for a pre-set number of short term updates at the start of a key cycle; balance filter: detects systematic positive or negative estimator imbalance and provides faster short term learning for updates that align with the detected imbalance.

When the vehicle is parked, the steering system is powered down, and no new friction information is available. Table 3 below summarises how the steering friction information at the start of the parked duration can be used to provide a reliable indication of the steering system friction at the end of the parked duration. For a short parked duration (minutes), the friction adaptation continues with values saved from the start of the parked duration. The justification being that the steering system friction is unlikely to have changed in this short duration. For a long parked duration: the long term estimate is restored, and the long term confidence is appropriately aged and restored; the short term estimate and confidence are then based on the restored long term values. For an intermediate parked duration, the long term estimate and confidence are restored in the same fashion as for a long parked duration; the short term estimate and confidence are a blend of the short park duration and long park duration values (the blend being based on the park duration).

TABLE 3

Update of short and long term estimates & confidences after vehicle has been parked

| Parked duration | Short term | | Long term | |
|---|---|---|---|---|
| | Estimate | Confidence | Estimate | Confidence |
| Short (minutes) | Continue with short term estimate from end of previous driving session | Continue with short term confidence from end of previous driving session | Continue with long term estimate from end of previous driving session | Continue with long term confidence from end of previous driving session |
| Intermediate | Blend of short and long park duration values | Blend of short and long park duration values | | Reduce long term confidence based on parked duration |
| Long (hours) | Continue with long term estimate from end of previous driving session | Weighted version of long term confidence | | |

Figure 13:
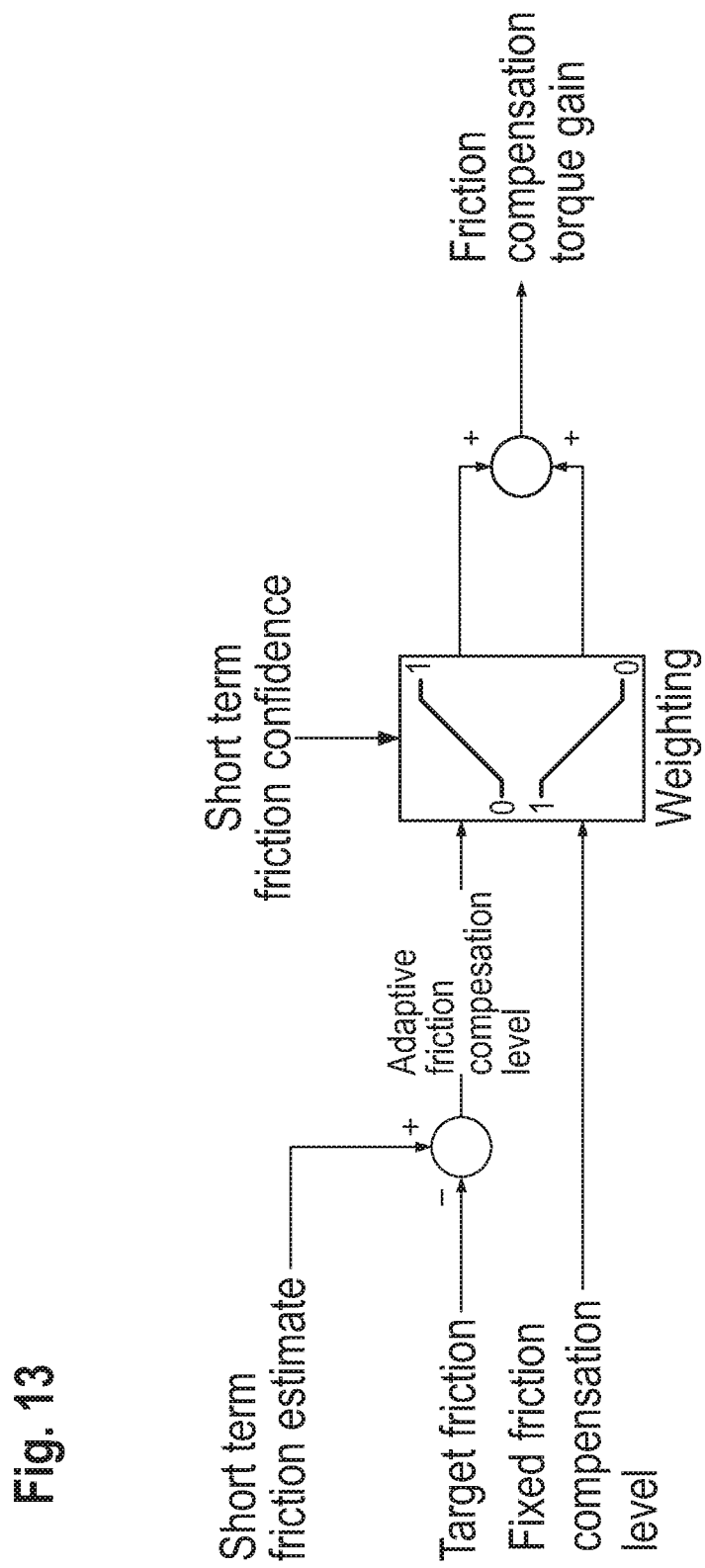
FIG. 13 shows in details the function performed by the friction estimator in generating the friction compensation torque gain.

FIG. 13 shows the friction compensation torque gain block of the friction estimator 21. The friction compensation torque level comprises two parts that are blended together, for example using simple addition with each given a weighting that defines the blend: an adaptive friction compensation torque level part; and a fixed friction compensation torque level part.

In the case where the short term friction confidence is high, the adaptive friction compensation torque level takes priority and is applied with full authority. In the case where the short term friction confidence is low, the fixed friction compensation torque level takes priority and is applied with full authority. In the case where the short term friction confidence is at an intermediate value, the friction compensation torque gain is a weighted sum of both the adaptive friction compensation torque level and the fixed friction compensation torque level.

The adaptive friction compensation torque level is determined by comparing the short term friction estimate with a target steering system friction value. The target friction value is the level of friction that the driver is to experience once appropriate compensation has been applied, as it is undesirable to remove all sensation of friction. The fixed friction compensation torque level is a fixed torque level that can be applied to an individual part, family of parts, or complete production run to bring that part or set of parts back to a nominal (and more acceptable) steering system friction level.

What is claimed is:

1. An electric power steering apparatus comprising:
   a steering mechanism which operatively connects a steering wheel to road wheels of a vehicle;
   an electric motor operatively connected to the steering mechanism;
   a torque signal generator adapted to produce a torque signal indicative of a torque carried by a portion of the steering mechanism;
   a column angular position signal generator for producing a column angle signal indicative of an angular position of the steering wheel or steering column; and
   a signal processing unit adapted to receive the column torque signal and the column angle signal and to produce therefrom a torque demand signal representative of a torque to be applied to the steering mechanism by the motor, in which the signal processing unit includes:
   a first signal processing circuit which receives an input signal dependent on the column torque signal and outputs an assistance torque signal, the relationship between the input and the output of the first signal processing circuit being defined by a boost curve;
   a second signal processing circuit which generates a friction compensating torque signal, the value of the friction compensating torque signal being derived from observations of both the column torque signal and the column angle signal over time; and a torque demand signal generating circuit adapted to produce a torque demand signal as a function of both the friction compensating torque signal and the assistance torque signal; and in which the friction compensating torque signal at least partially assists the driver in overcoming the effects of static and/or kinetic friction in the steering mechanism;

the apparatus further comprising:

a friction estimator which generates an estimate of the static friction in the steering mechanism; and in which the friction compensating torque signal generated by the second signal processing circuit is adapted as a function of the estimate of friction.

2. The electric power steering apparatus according to claim 1, in which the second signal processing circuit generates the friction compensating torque signal by generating a dimensionless friction compensation factor and multiplying that factor by a friction compensation torque level that is adapted as a function of the estimated friction.

3. The electric power steering apparatus according to claim 2, in which the friction compensation factor has a value in the range+1 to −1 and is determined using an equation of the form:

Friction compensation factor=$X$*Accumulated column angle+$Y$*Accumulated column torque where X and Y are themselves scaling factors.

4. The electric power steering apparatus according to claim 1, in which the friction estimate is formed by observing a change in torque in a portion of the steering column as a function of column angle.

5. The electric power steering apparatus according to claim 1, in which the friction estimator generates an estimate of steering system friction every time the steering mechanism changes direction.

6. The electric power steering apparatus according to claim 5, in which the friction estimator includes a friction estimate manager that generates a confidence value indicative of a confidence in the estimated steering system friction.

7. The electric power steering apparatus according to claim 6, in which the friction estimator generates a friction compensation torque level by blending a fixed friction compensation torque level with an adaptive friction compensation torque level, where the fixed friction compensation torque level represents a fixed value and the adaptive friction compensation torque level is a function of the friction estimate.

8. The electric power steering apparatus according to claim 7, in which the friction estimator determines a ratio at which the two levels are blended that is a function of the confidence value of the friction estimate.

9. The electric power steering apparatus according to claim 8, in which the friction estimator blends the two levels so that the blend entirely or predominantly consists of the fixed friction compensation torque level when there is little or no confidence in the estimate.

10. The electric power steering apparatus according to claim 9, in which the friction estimate manager generates two confidence values associated with the friction estimate, one being a long term confidence value indicative of a level of confidence in the friction estimate over a first period of time and the other a short term confidence value indicative of a level of confidence in the friction estimate over a second, shorter, period of time, the short term confidence value being generated from one or more recent estimates of friction and the long term confidence value being set dependent on the value of the short term confidence value where a weight is a tuneable parameter.

11. The electric power steering apparatus according to claim 10, in which the friction estimate manager generates the long term confidence value that decays over time from a high confidence value to a low confidence value over a period of time whenever the short term confidence value has not been updated in that period of time.

* * * * *